(12) United States Patent
Park et al.

(10) Patent No.: US 7,697,458 B2
(45) Date of Patent: Apr. 13, 2010

(54) NODE FOR SELF LOCALIZATION, CLUSTERING METHOD USING THE SAME, AND LOCALIZATION METHOD

(75) Inventors: Jongjun Park, Gyeongsan (KR); Jong Oh Lee, Daejeon (KR); Sun Joong Kim, Daejeon (KR); Cheol Sig Pyo, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 369 days.

(21) Appl. No.: 11/759,450

(22) Filed: Jun. 7, 2007

(65) Prior Publication Data

US 2008/0069008 A1     Mar. 20, 2008

(30) Foreign Application Priority Data

Sep. 18, 2006     (KR) .................. 10-2006-0090146

(51) Int. Cl.
*H04L 12/16* (2006.01)
(52) U.S. Cl. .................. 370/254; 370/328; 370/465
(58) Field of Classification Search .................. None
See application file for complete search history.

(56) References Cited

U.S. PATENT DOCUMENTS

| | | | |
|---|---|---|---|
| 6,674,403 B2 | 1/2004 | Gray et al. | |
| 6,678,750 B2* | 1/2004 | Meade et al. | 710/7 |
| 6,744,740 B2* | 6/2004 | Chen | 370/255 |
| 7,035,240 B1* | 4/2006 | Balakrishnan et al. | 370/338 |
| 7,206,293 B2* | 4/2007 | Kasapi et al. | 370/312 |
| 7,289,466 B2* | 10/2007 | Kore et al. | 370/328 |
| 7,397,782 B2* | 7/2008 | Posamentier | 370/338 |
| 2004/0213190 A1 | 10/2004 | Kyperountas et al. | |

FOREIGN PATENT DOCUMENTS

| | | |
|---|---|---|
| KR | 1020050065389 | 6/2005 |
| KR | 1020060020886 | 3/2006 |

OTHER PUBLICATIONS

Notice of Allowance dated Nov. 28, 2007 issued from the Korean Patent Office.
Davide Dardari, et al "A Sub-Optimal Hierarchical Maximum Likelihood Algorithm for Collaborative Localization in Ad-Hoc Networks". IEEE, 2004.

* cited by examiner

*Primary Examiner*—Robert W. Wilson
(74) *Attorney, Agent, or Firm*—Ladas & Parry LLP

(57) ABSTRACT

A node for self localization, a clustering method using the same, and a localization method are provided. The node, which is located in a specific space so as to constitute a sensor network, includes a location information messaging unit which receives one or more location information messages including information on spatial locations of one or more neighboring nodes in the sensor network from the neighboring nodes in the sensor network; a distance calculator which calculates a first distance to the neighboring node on the basis of the location information included in the received location information messages and calculates a second distance to one or more neighboring nodes on the basis of the received time or intensity of the message on the location information; and a clustering unit which forms clusters of the node and a plurality of neighboring nodes in which the difference between the first and second distances is less than a predetermined threshold.

13 Claims, 9 Drawing Sheets

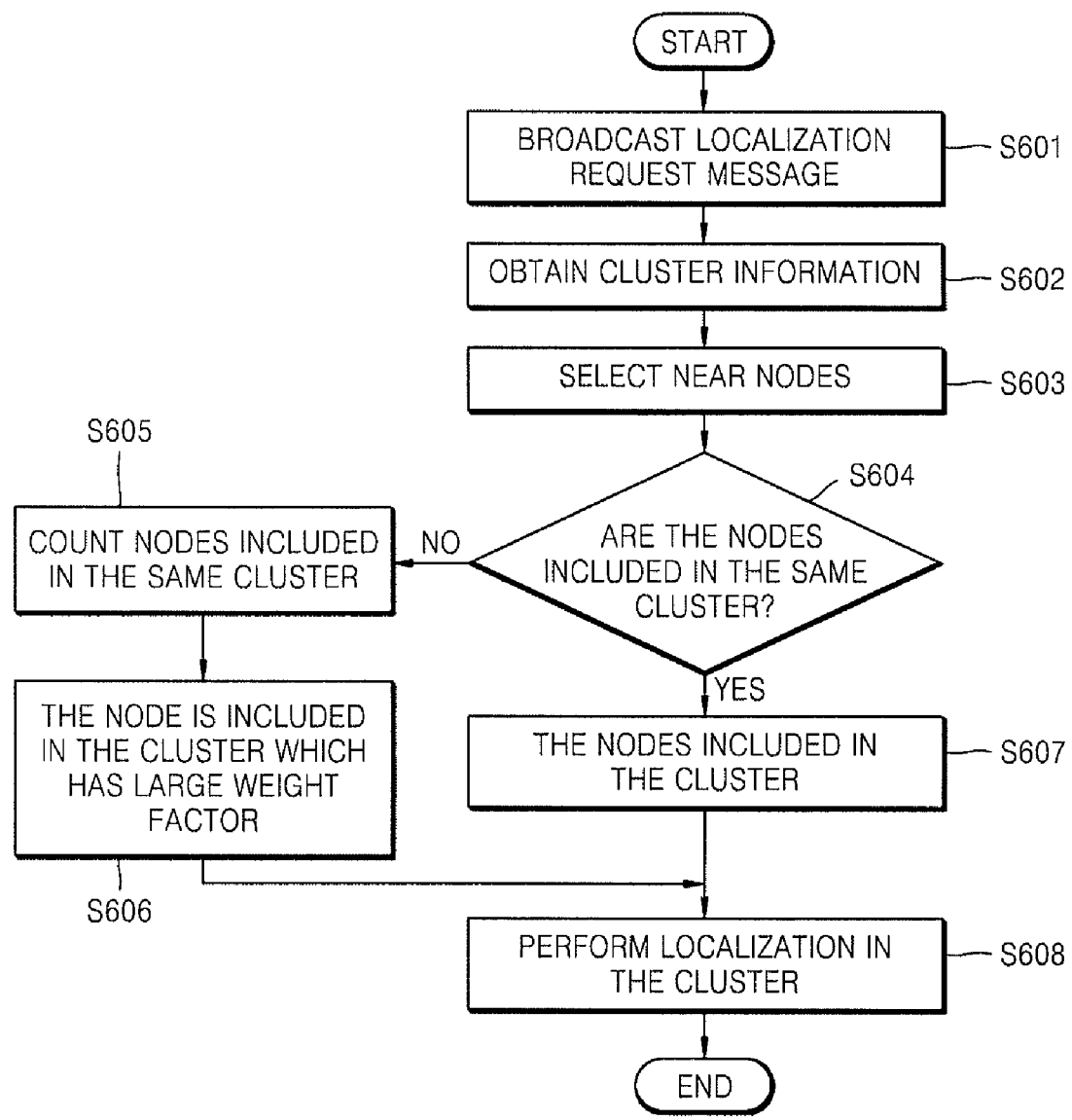

NODE FOR SELF LOCALIZATION, CLUSTERING METHOD USING THE SAME, AND LOCALIZATION METHOD

CROSS-REFERENCE TO RELATED PATENT APPLICATION

This application claims the benefit of Korean Patent Application No. 10-2006-0090146, filed on Sep. 18, 2006, in the Korean Intellectual Property Office, the disclosure of which is incorporated herein in its entirety by reference.

BACKGROUND OF THE INVENTION

1. Field of the Invention

The present invention relates to a node for self localization, a clustering method using the same, and a localization method, and more particularly, to a node for self localization based on clusters in a wireless sensor network, a clustering method using the same, and a localization method.

2. Description of the Related Art

Methods of localizing a node in wireless sensor networks are roughly classified into a method of localizing a node using information on a measured distance and a method of localizing a node without information on a measured distance.

In the method of localizing a node using information on a measured distance, location of the node is found by performing triangulation after a distance between a node of which location is to be determined and an anchor node of which location is known.

A distance between nodes is generally measured by a time of arrival (ToA) method, a time difference of arrival (TDoA) method, and a received signal strength (RSS) method.

In the ToA method, a distance is measured by using a time during which a signal with a known transmission speed moves between nodes. In the TDoA method, a distance is measured by using a difference in the times of arrival of the signals by simultaneously transmitting two signals which have different transmission speeds.

When the transmission speed of the signal decreases, and there are no obstacles, the ToA method and the TDoA method can obtain an accurate measurement value.

However, when a signal such as a radio frequency (RF) signal with a high transmission speed is used, it is difficult to measure an accurate difference between distances. In the TDoA method, two signals are used, and therefore additional hardware or an additional sensor is needed.

In addition, when a signal such as an ultrasonic wave or sound wave with a high transmission speed is used for ToA and TDoA methods, it is difficult to secure against line of sight (LoS). Since the ToA and TDoA methods are largely influenced by indoor obstacles, it is difficult to communicate each other.

In the RSS method, a distance is measured by using the intensity of a signal that arrives at a node. The RF signal used for the RSS method has a good diffraction property and secures against LoS without additional hardware, but hardly measure an accurate distance, too.

In general, the RSS method has a low degree of accuracy for measuring distance. The RSS method is largely influenced by indoor obstacles such as walls or furniture.

In an angle of arrival (AoA) method, the location of a node is determined by using an angle between two nodes which communicate with each other. In the AoA method, in order to find an angle, a ToA or RSS value is converted into an angle by using a multi-antenna.

However, it is difficult to construct hardware for mounting the multi-antenna on the general node. The size of the node increases, and accordingly AoA is not generally used.

The localization method without distance information includes a centroid method and an approximate point in triangulation (APIT) method. The localization method without distance information is used for preventing an error from spreading in the sensor network which constitutes a multi-hop network.

In the centroid method, regularly arranged anchor nodes transmit their own location information to neighboring nodes, and the nodes estimate their own locations by comparing the intensities of the signals received from the anchor nodes.

In the centroid method, as the anchor nodes are regularly arranged, the number of anchor nodes which can communicate with the node increases, and the RF transmission environment is similarly maintained, it is possible to measure the location of the node. Accordingly, the centroid method is not suitable for indoors.

In the APIT method, the location of the node is estimated by determining whether the node exists in the triangle constructed by anchor nodes. In the APIT method, the location of the node is estimated by also using the intensity of the signal.

As described above, in the conventional localization method, it is difficult to accurately localize the node, because the signal error caused by obstacles is included in a triangulation value in indoor environments where there are many obstacles.

SUMMARY OF THE INVENTION

The present invention provides a node for self localization capable of accurately localizing a node even in indoor environments where there are many obstacles, a clustering method using the same, and a localization method.

According to an aspect of the present invention, there is provided a node which is located in a specific space so as to constitute a sensor network, the node including: a location information messaging unit which receives one or more location information messages including information on spatial locations of one or more neighboring nodes in the sensor network from the neighboring nodes in the sensor network; a distance calculator which calculates first distances from the node to the neighboring nodes on the basis of the location information included in the received the location information messages and calculates second distances from the node to the neighboring nodes on the basis of a received time or intensity of the location information message; and a clustering unit which forms a cluster of the node and a plurality of neighboring nodes of which the difference between the first and second distances is less than a predetermined threshold.

According to another aspect of the present invention, there is provided a new node which is added to the sensor network constructed by clusters including at least one node, the new node including: a location request messaging unit which receives location response messages including information on the spatial locations of at least one node and information on the clusters including the nodes from the nodes; a cluster determiner which calculates distances from the node to each node on the basis of a received time or intensity of the location response message and determines the cluster including one or more nodes of which the difference between first and second distance is less than the predetermined threshold to be the cluster including the node; and a localization unit which recognizes relative distances from the node to one or more nodes in the cluster including the node to localize the new node's own location.

According to another aspect of the present invention, there is provided a method of forming clusters of nodes which are located in a specific space so as to constitute a sensor network, the method including: receiving one or more location information messages including information on spatial locations of one or more neighboring nodes in the sensor network from the neighboring nodes in the sensor network; calculating first distances from the node to the neighboring node on the basis of the location information included in the received the location information messages and calculating second distances from the node to one or more neighboring nodes on the basis of a received time or intensity of the location information message; and forming clusters of the node and a plurality of neighboring nodes of which the difference between the first and second distances is less than a predetermined threshold.

According to another aspect of the present invention, there is provided a method of localizing a new node which is added to a sensor network constructed by clusters including at least one node, the method including: receiving location response messages including information on the spatial locations of the nodes and information on the clusters including the nodes from the nodes; calculating distances from the node to each node on the basis of a received time or intensity of the location response message and determining the cluster including the node of which the difference between first and second distance is less than the predetermined threshold to be the cluster including the node; and recognizing relative distances from the node to one or more nodes in the cluster including the node to localize the new node's own location.

As described above, according to an embodiment of the present invention, nodes located in the environments in which there are many obstacles form clusters by themselves and find the cluster including the nodes themselves to provide the accurate localization in the cluster.

BRIEF DESCRIPTION OF THE DRAWINGS

The above and other features and advantages of the present invention will become more apparent by describing in detail exemplary embodiments thereof with reference to the attached drawings in which:

FIG. 6 is a flow chart of a localization method according to another embodiment of the present invention;

DETAILED DESCRIPTION OF THE INVENTION

Now, preferred embodiments of the present invention will be described in detail with reference to the attached drawings.

In a wireless sensor network constructed by a plurality of indoor nodes, an embodiment of the present invention includes a structure for automatically clustering nodes which recognize their own locations for localization, a structure for searching for a cluster in which a node to be localized is included, and a structure for performing triangulation in the cluster.

Figure 1:
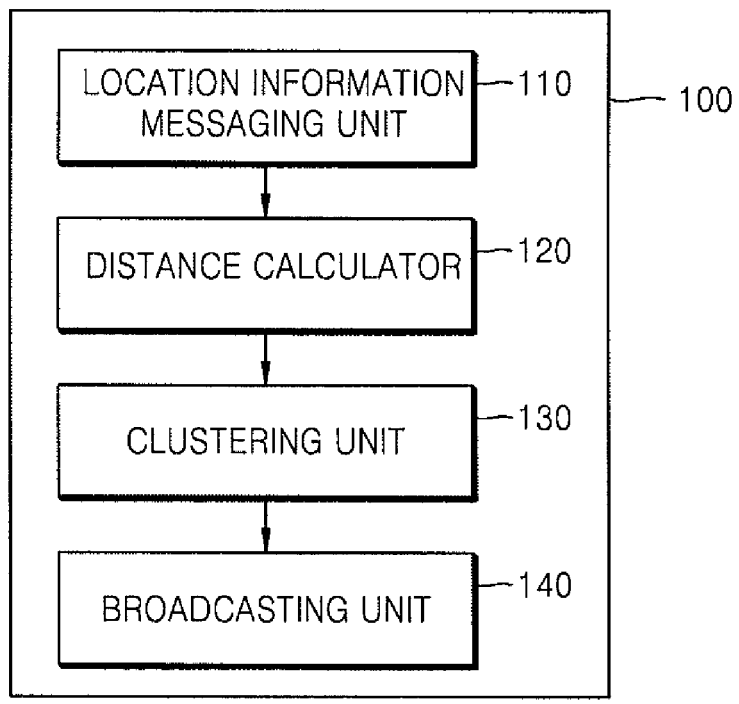
FIG. 1 illustrates a structure of a node for self clustering according to an embodiment of the present invention.

FIG. 1 illustrates a structure of a node for self clustering according to an embodiment of the present invention. Referring to FIG. 1, a node 100 includes a location information messaging unit 110, a distance calculator 120, a clustering unit 130, and a broadcasting unit 140.

A sensor network is constructed by disposing the node 100 in a specific space. At least one node exists in the sensor network.

The location information messaging unit 110 receives messages including the information on the spatial locations of one of more neighboring nodes in the sensor network from the neighboring nodes in the sensor network.

The distance calculator 120 calculates first distances from the node 100 to the neighboring node on the basis of the location information included in the received location information messages.

In addition, the distance calculator 120 calculates second distances from the node 100 to one or more neighboring nodes on the basis of the received time or intensity of the location information message.

The clustering unit 130 creates a cluster using the node 100 and a plurality of neighboring nodes in which the difference between the first and second distances is less than a predetermined threshold.

When an obstacle (for example, a wall) exists between nodes, although a signal penetrates the obstacle, there is a large error between the estimated distance and the real distance.

Using the aforementioned principle, the node is determined to be clustered together with the nodes which have a difference between the estimated distance (a second distance) and the real calculated distance (a first distance) that is less than a predetermined threshold, In the present invention, nodes which are less influenced by an obstacle, such as nodes in a room, form a cluster, and triangulation is performed by using signals within the cluster to provide accurate localization in environments where there are many obstacles.

The node 100 may include the broadcasting unit 140. The broadcasting unit 140 broadcasts the location information message including its own location information in the sensor network.

Figure 2:
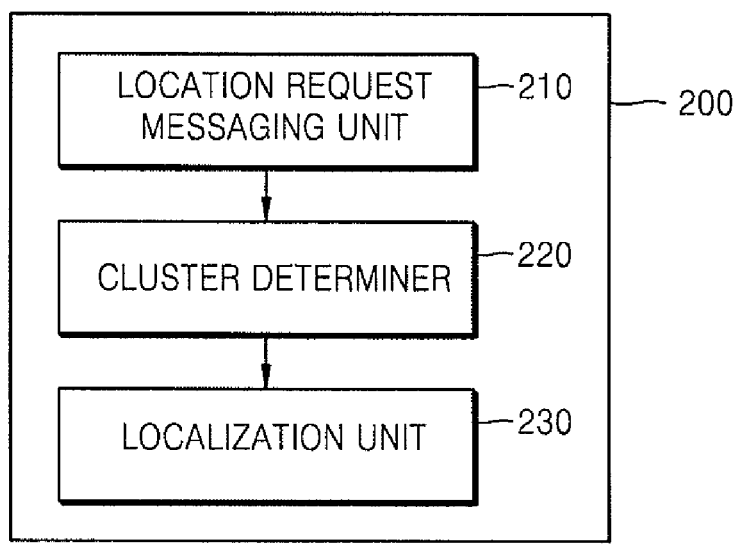
FIG. 2 illustrates a structure of a new node for self localization according to an embodiment of the present invention.

FIG. 2 illustrates a structure of a new node for self localization according to an embodiment of the present invention. Referring to FIG. 2, a new node 200 includes a location request messaging unit 210, a cluster determiner 220, and a localization unit 230.

The new node 200 is a node added to the sensor network constructed by clusters including at least one node.

The location request messaging unit 210 receives location response messages including information on the spatial locations of one or more nodes and information on the cluster including the nodes from the nodes. The information on the cluster including the node may include an identification code of the cluster and the number of fixed nodes included in the cluster.

The cluster determiner 220 calculates the distance from the new node 200 to each node on the basis of the received time or intensity of the location response message and determines that the nodes which have a calculated distance that is less than the predetermined threshold belong to the cluster including the new node 200.

The cluster determiner 220 counts the nodes which transmit the location response message. The cluster determiner 220 determines that the cluster including the maximum number of nodes, from among fixed nodes which send the location response message, is the cluster including the new node 200.

The localization unit 230 recognizes a relative distance from the new node 200 to one or more nodes in the cluster including the new node 200 in order to localize its own location. The localization unit 230 recognizes its own location by triangulation.

The new node 200 may further include a broadcasting unit for broadcasting a localization request message for requesting the localization of its own location in the sensor network.

Figure 3:
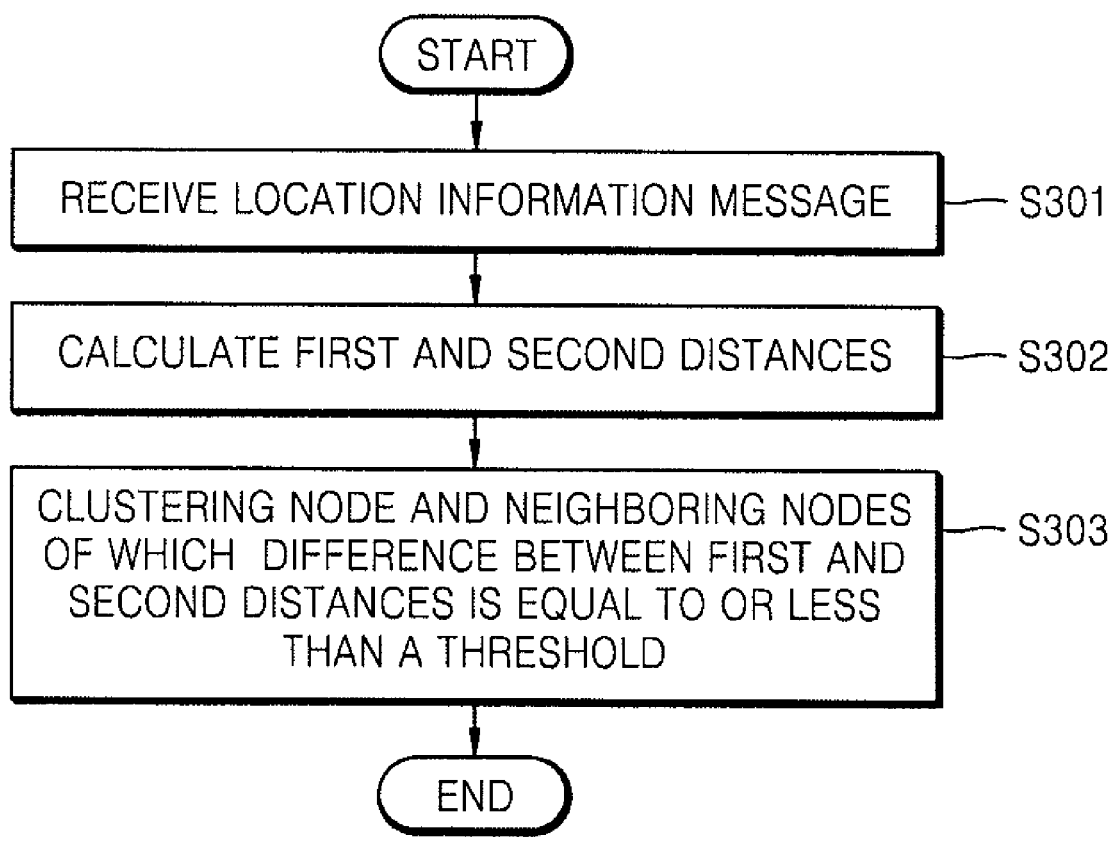
FIG. 3 is a flow chart of a method of clustering for self localization according to an embodiment of the present invention.

FIG. 3 is a flow chart of a method of clustering for self localization according to an embodiment of the present invention. The sensor network includes one or more nodes located in a specific space.

Referring to FIG. 3, each node receives one or more messages on the location information including information for representing spatial locations of one or more neighboring nodes in the sensor network from the neighboring nodes which exist in the sensor network (Operation S301).

The node calculates a first distance between the node and neighboring nodes on the basis of the location information included in the received location information messages. The node calculates a second distance from the node to the neighboring nodes on the basis of the received time or intensity of the location information message (Operation S302).

The node forms a cluster together with a plurality of neighboring nodes which have a difference between the first and second distances, which is less than the predetermined threshold (Operation S303).

When an obstacle (for example, a wall) exists between nodes, although a signal penetrates the obstacle, there is a large error between the estimated distance and the real distance.

Using the aforementioned principle, the node is determined to form a cluster together with the nodes which have the difference between the estimated distance (a second distance) and the real calculated distance (a first distance), which is less than a predetermined threshold.

Figure 4A:
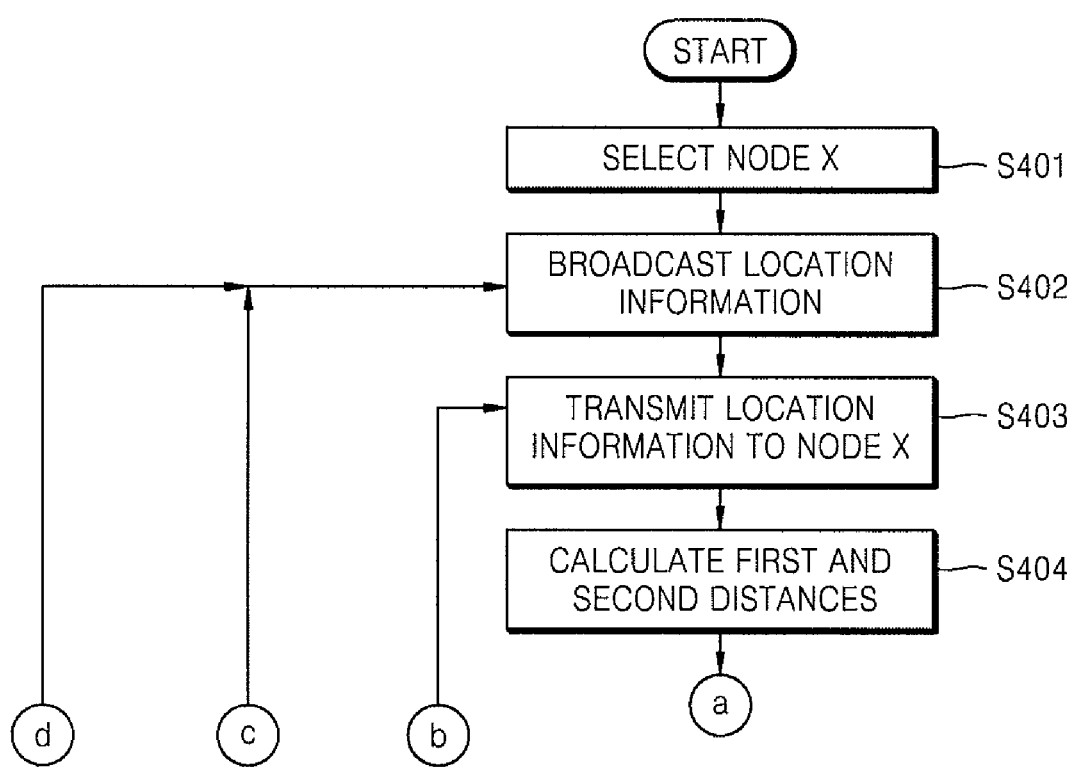
FIG. 4 is a flow chart of a method of clustering for self localization according to another embodiment of the present invention.
Figure 4B:
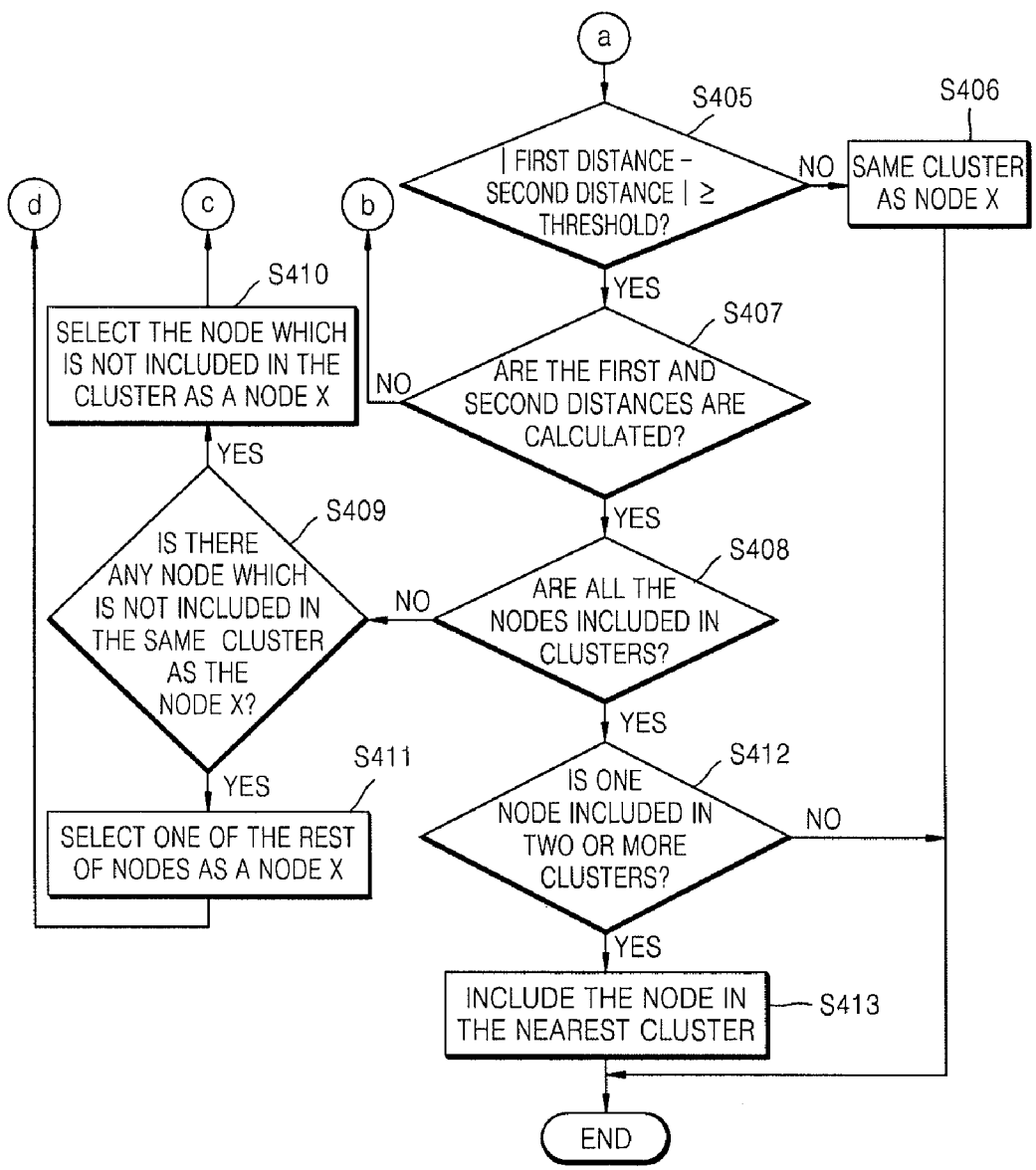

FIG. 4 is a flow chart of a method of clustering for self localization according to another embodiment of the present invention. The cluster is automatically formed among nodes which recognize their own locations.

It is assumed that nodes arranged in an indoor wireless sensor network recognize their own locations.

Referring to FIG. 4, firstly, any node X from among nodes which recognize their own locations are selected (Operation S401).

The selected node X broadcasts information on its own location (Operation S402).

The node X sends the information on its own location in a location information message.

Nodes Ya to Yn, which receive the location information from the node X, transmit their own location information to the node X (Operation S403).

The nodes Ya to Yn, which receive the location information, can send their own location information in a location information message.

The node X calculates real distances (first distances) between the node X and nodes Ya to Yn by using the location information received from the nodes Ya to Yn and its own location information (Operation S404).

The node X calculates estimated distances by using the RSS and ToA in the location information message received from the nodes Ya to Yn (Operation S404).

The node X compares the difference between the calculated real distances (first distances) and the estimated distances (second distances) with the predetermined threshold (Operation S405).

When there is an obstacle such as a wall between nodes, although a signal penetrates the obstacle, an error between the real distance and the estimated distance increases by a large amount, as compared with the case where there are no obstacles. In an embodiment of the present invention, the nodes between which there are no obstacles form a cluster by using the aforementioned principle.

The nodes, which have the difference between the first and second distances that is less than the predetermined threshold, are determined to belong to the same cluster as the node X (operation S406).

It is checked whether the calculation of the first and second distances is completed with respect to the nodes Ya to Yn which receive the location information (Operation S407).

When the calculation of the first and second distances is not completed with respect to the nodes Ya to Yn which receive the location information, operations are repeated from operation S403.

When the calculation of the first and second distances is completed with respect to the nodes Ya to Yn which receive the location information, it is checked whether all the nodes in the sensor network are allocated to clusters (Operation S408, S409).

When all the nodes in the sensor network are not allocated to clusters, and there is a node, which is not included in the same cluster as the node X, from among the nodes which receive the location information, one of the nodes is selected as the node X (Operation S410).

When there is no node, which is not included in the same cluster as the node X, any node from among the rest of the nodes is selected as the node X (Operation S411).

Clustering is performed until all the nodes in the sensor network are included in clusters.

When all the nodes in the sensor network are allocated to the clusters, it is checked whether one node is included in two or more clusters (Operation S412).

Since the node has to be allocated to only one cluster, the node searches clusters again, and the node is included in the cluster in which the nearest node is included (Operation S413). When the node exists at the border between clusters, the aforementioned case may occur.

Figure 5:
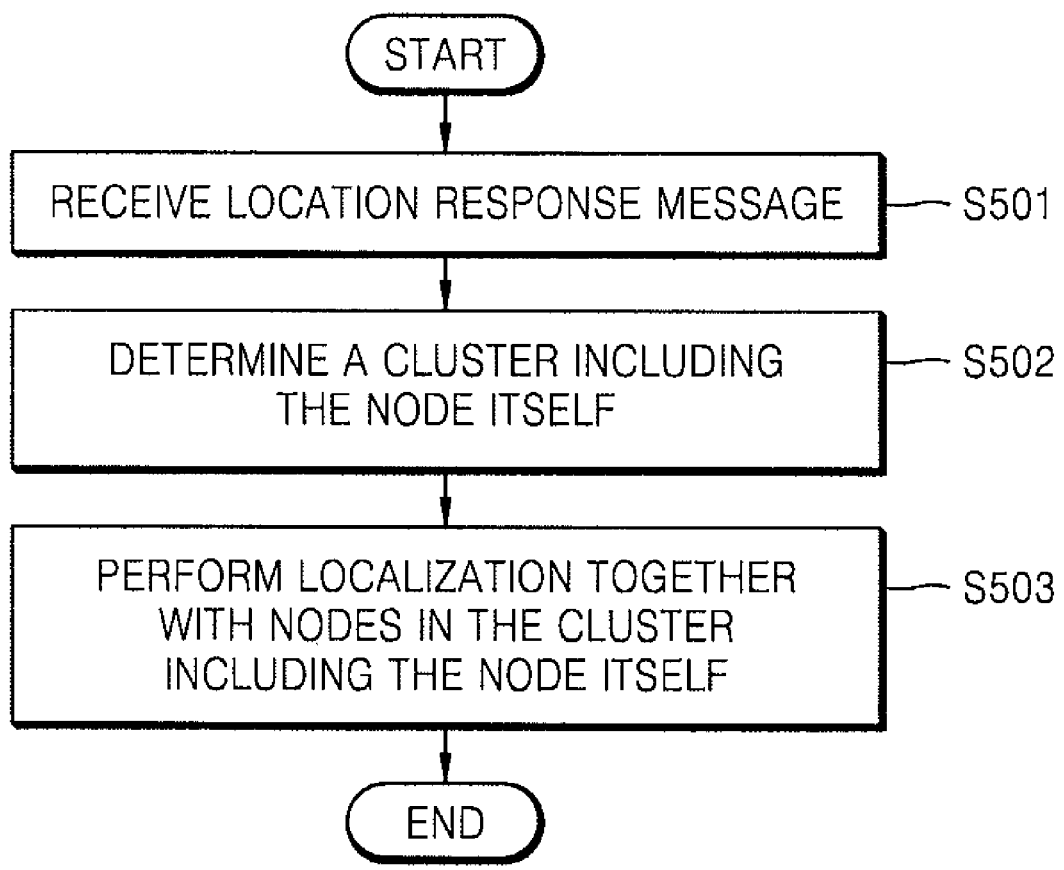
FIG. 5 is a flow chart of a localization method according to an embodiment of the present invention.

FIG. 5 is a flow chart of a localization method according to an embodiment of the present invention. When a new node is added to the sensor network, the node needs to be localized. The localization method will now be described in detail.

The node receives a location response message including information on the spatial locations of one or more nodes and information on the clusters including the nodes from the nodes (Operation S501).

The node determines that the cluster including the node which has the distance calculated on the basis of the received time or intensity of the location response message that is less than the predetermined threshold is the cluster including the node (Operation S502).

The node recognizes a relative distance from the node to one or more nodes in the cluster including the node and localizes its own location (Operation S503).

FIG. 6 is a flow chart of a localization method according to another embodiment of the present invention.

The node that is newly disposed in the wireless sensor network in which clustering is completed needs to be localized. For example, a node is added or moved to the sensor network.

First, the node which needs to be localized broadcasts a localization request message (Operation S601). The node which needs to be localized enables the surrounding nodes to know that the node needs to be localized, in order to find a cluster including the node.

Nodes, which receive the localization request message from the node which needs to be localized, transmit cluster information including their own cluster number and the total number of nodes in their own cluster to the node which needs to be localized (Operation S602).

The node, which needs to be localized, can receive the cluster information from most of the nodes in the cluster including the node itself. The node, which needs to be localized, rarely receives the message from all the nodes in the other clusters.

The node, which needs to be localized, selects the predetermined number of nodes which have a distance obtained by using RSS or ToA that is short enough. It is checked whether the selected nodes are included in the same cluster (Operation S603).

When the selected nodes are included in the same cluster, the node which needs to be localized is included in the corresponding cluster (Operation S604).

When the selected nodes are not included in the same cluster, the nodes in the same cluster as the selected node from among the nodes which send the cluster information are counted (Operation S605).

The nodes are included in the cluster which has a large weight (Operation S606). The weight factor is a value obtained by dividing the counted number of nodes by the total number of nodes in the cluster.

Since clusters are mainly determined by indoor walls, one cluster generally represents a room. Specifically, when the cluster represents a room, the cluster including the node is recognized, and accordingly the location of the room in which the node exists is recognized.

Since a signal passing through an obstacle in indoor localization has a large error in terms of the measurement of distance, an error in localization also increases. Using the aforementioned principle, the nodes which are less influenced by the obstacle form a cluster and perform accurate localization by triangulation by using only signals inside the cluster.

The embodiment includes the following operations for accurate localization. In the wireless sensor network constructed by a plurality of indoor nodes, the embodiment includes (a) automatically clustering the nodes whose locations are recognized, (b) finding a cluster including the node which needs to be localized, and (c) performing triangulation in the cluster.

FIGS. 7A to 7D illustrates a method of clustering according to an embodiment of the present invention, step by step. FIGS. 7A to 7D illustrate (a) automatically creates a cluster by using the nodes which recognize their own locations, in detail.

Figure 7A:
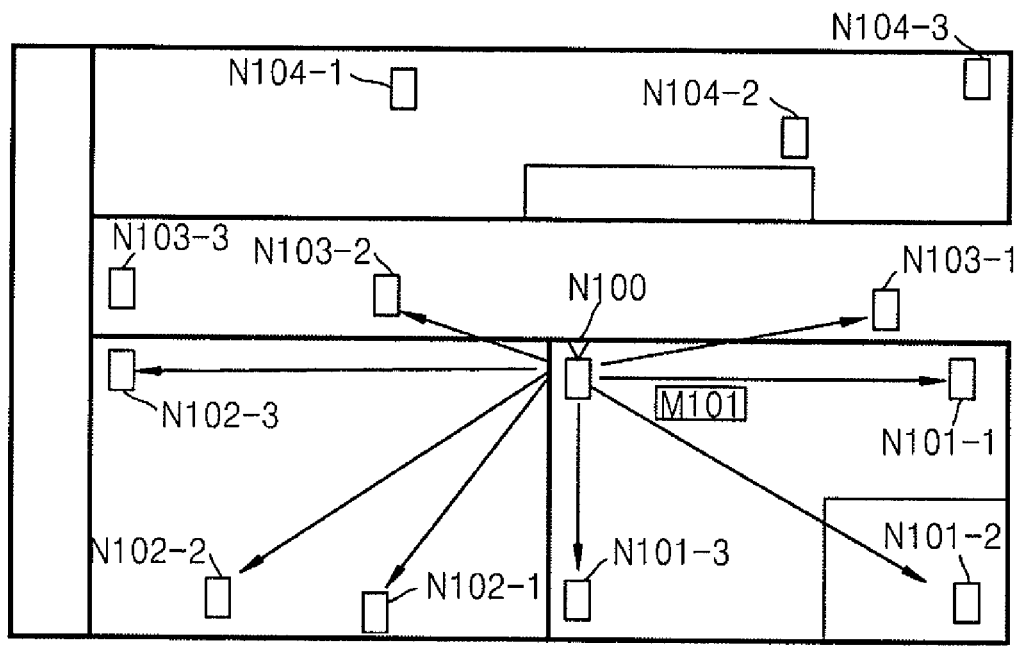
FIGS. 7A to 7D illustrate a method of creating a cluster according to an embodiment of the present invention, step by step.

FIG. 7A illustrates an operation of initial clustering according to an embodiment of the present invention. Referring to FIG. 7A, the nodes located in the indoor wireless sensor network recognize their own locations.

First, any node X from among the nodes which recognizes its own location is selected to broadcast its own location information.

In FIG. 7A, the node X is N100. Reference numerals N101-$x$ to N104-$x$ indicate nodes located in rooms 1 to 4.

The node X broadcasts its own location information in the M101 message in the sensor network.

Figure 7B:
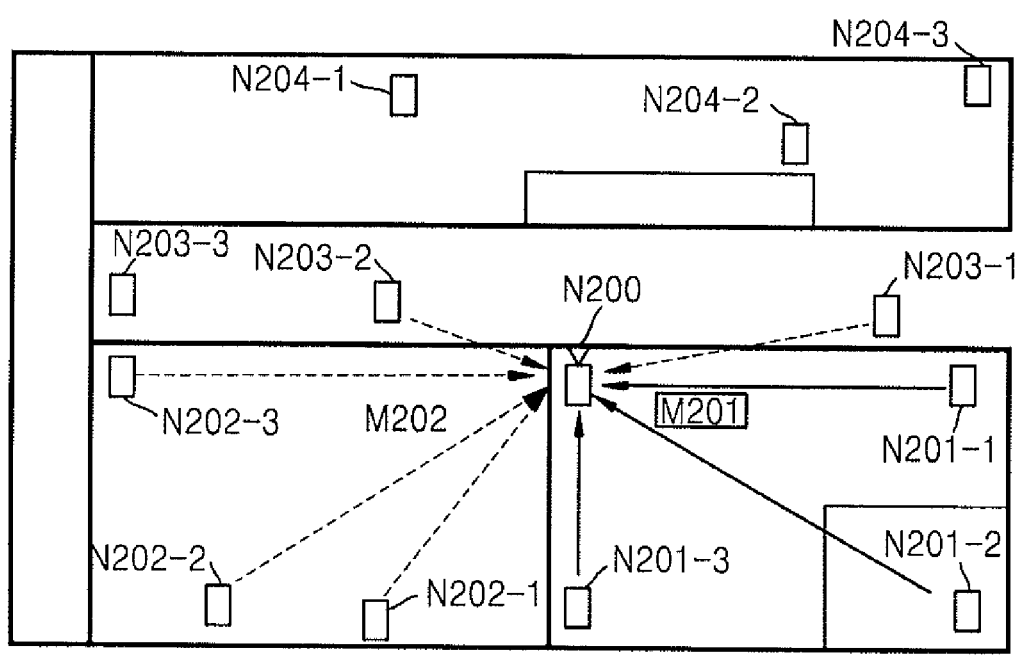

FIG. 7B illustrates an operation of distinguishing clusters in the clustering method according to an embodiment of the present invention.

Referring to FIG. 7B, the nodes, which receive the M101 message, send their own location information to the node X. The node X estimates a distance by using the RSS or ToA in the message received from each node.

The node X calculates a real distance between the node X and each node by using the location information of the received message and its own location information. Here, reference numerals N201-1, N201-2, N201-3, N202-1, N202-2, N202-3, N203-1, and N203-2 represent the nodes which receive the message from the node X.

Figure 7C:
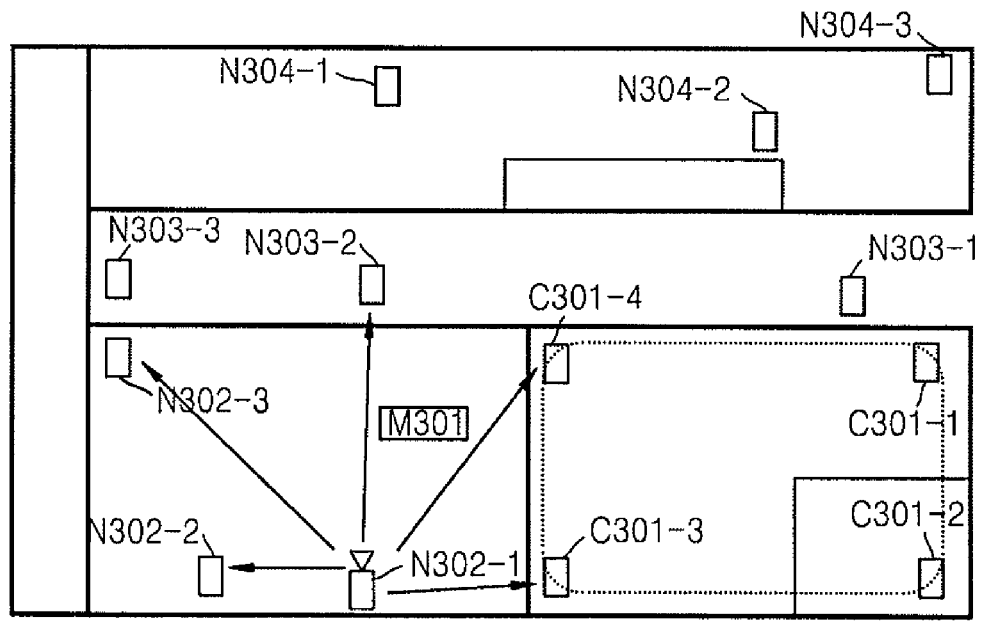

FIG. 7C illustrates an operation of clustering in the clustering method according to an embodiment of the present invention.

When an obstacle exists between nodes, although a signal penetrates the obstacle, there is a large error between the estimated distance and the real distance. The node X is determined to form a cluster together with the nodes which have the difference between the estimated distance and the real calculated distance that is less than a predetermined threshold.

Referring to FIG. 7C, nodes C301-1, C301-2, C301-3, and C301-4 form a cluster, and the node N202-2 performs the operation of clustering, again.

After the cluster is formed, when there is a node, which communicates with the node X and is not included in the same cluster as the node X, the node is defined as the node X. Otherwise, a node from among the rest of the nodes is defined as the node X. Then the aforementioned operations are repeated until all of the nodes in the sensor network are included in clusters.

When a node is included in two or more clusters, as in the case where the node exists at the border between clusters, the node searches the cluster again.

Since the node has to be included in only one cluster, the node searches clusters again. The node selects the nearest node and the node is included in the cluster in which the nearest node is included.

Figure 7D:
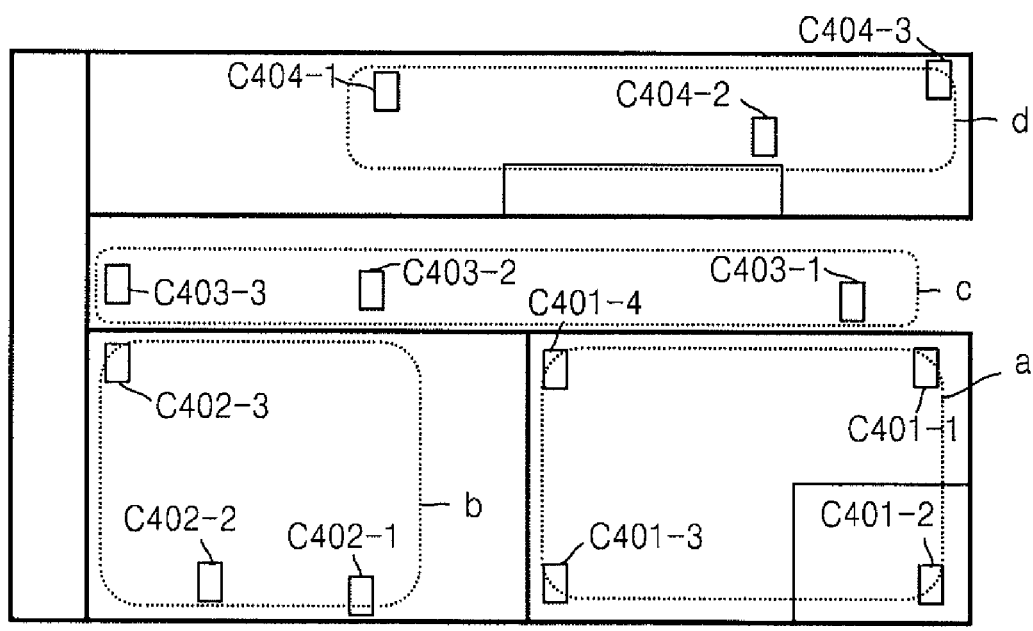

FIG. 7D illustrates an operation of completing clustering in the clustering method according to an embodiment of the present invention. Four clusters are formed in the sensor network illustrated in FIG. 7D.

A cluster a includes nodes C401-1, C401-2, C401-3, and C401-4. A cluster b includes nodes C402-1, C402-2, and C402-3.

A cluster c includes nodes C403-1, C403-2, C403-3, and C403-4. A cluster d includes nodes C404-1, C404-2, and C404-3. As described above, in the embodiment, all the nodes in the sensor network are included in clusters.

In the wireless sensor network constructed by a plurality of indoor nodes, the embodiment includes (a) automatically creating a cluster by using the nodes of which locations are recognized, (b) finding a cluster including the node which needs to be localized, and (c) performing triangulation in the cluster. Operations (b) and (c) are described in detail with reference to FIGS. 8A and 8B.

Figure 8A:
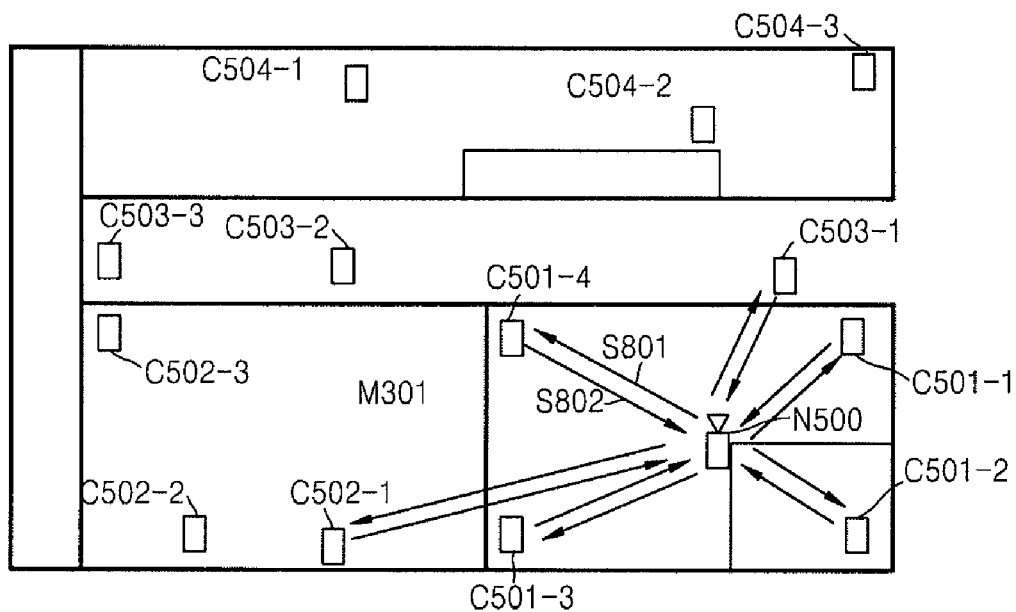
FIGS. 8A and 8B illustrate a method of localizing a new node, step by step, according to an embodiment of the present invention.
Figure 8B:
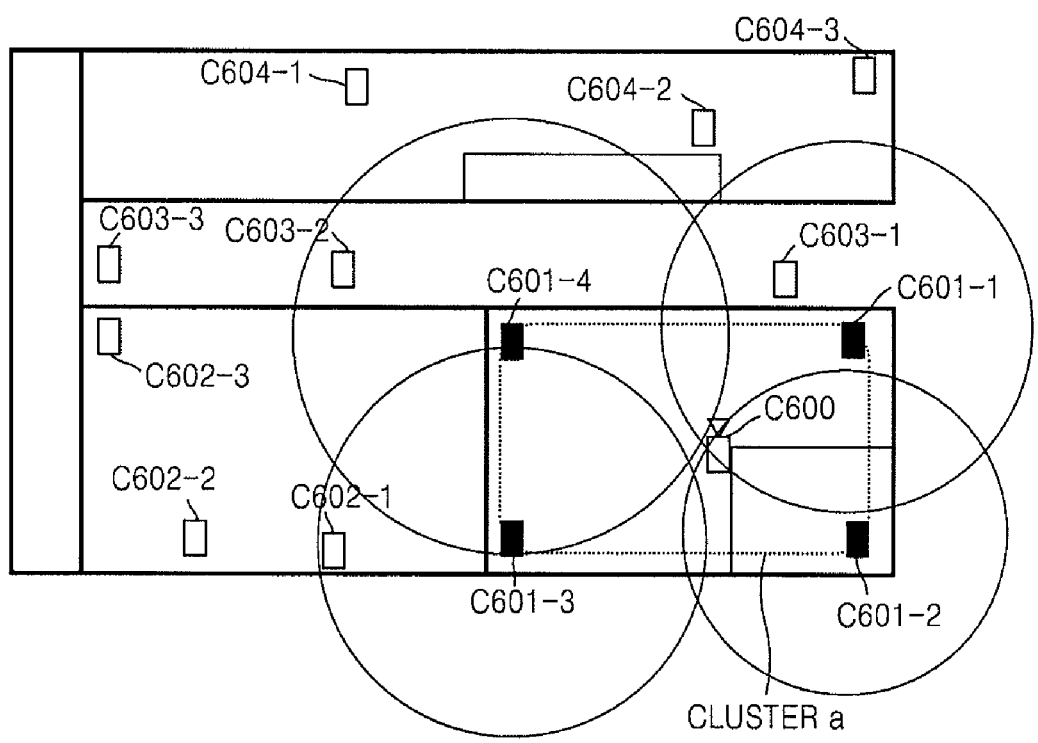

FIGS. 8A and 8B illustrate a method of localizing a new node, step by step, according to an embodiment of the present invention. FIG. 8A illustrates an operation of discriminating clusters for localization of a new node according to an embodiment of the present invention.

In FIG. 8A, a node N500 is a node which needs to be localized. The node N500 which needs to be localized enables the surrounding nodes to know that the node needs to be localized (Operation S801). In order to perform the localization according to the embodiment, the cluster including the node has to be found first. The node which needs to be localized enables the surrounding nodes to know that the node needs to be localized by broadcasting.

The nodes, which receive the message from the node N500, transmit their own cluster number and the total number of nodes in their clusters to the node N500 (Operation S802).

The node N500 counts the received cluster number. The node N500 can receive the cluster information from most of the nodes in the cluster including the node itself. The node N500 rarely receives the message from all the nodes in the other clusters.

Accordingly, the node N500 selects the predetermined number of nodes which have a distance obtained by using RSS or ToA, which is short enough. When the cluster numbers of the selected nodes are the same, the node N500 is included in the corresponding cluster.

However, when the cluster numbers of the selected nodes are different, the node N500 is included in the cluster including the node which has a value obtained by dividing the number of nodes counted in the cluster by the total number of nodes, which is large.

Since clusters are mainly determined by indoor walls, and one cluster generally represents a room. Specifically, when the cluster represents a room, the cluster including the node is recognized, and accordingly the location of the room in which the node exists is recognized.

FIG. 8B illustrates a localization operation based on clusters formed by using the method of localizing a new node according to an embodiment of the present invention.

Referring to FIG. 8B, a new node C600 receives the RSS or ToA value from nodes C601-1 to C601-4 included in the cluster including the node C600 and estimates distances in order to determine its own location by using triangulation.

According to an embodiment of the present invention, accurate localization can be performed indoors by using the nodes which are included in the same cluster and are not influenced by an obstacle.

As described above, in the node for self localization, the clustering method using the same, and the localization method according to an embodiment of the present invention, nodes located in environments where there are many obstacles form clusters by themselves and find the cluster including the nodes themselves in order to perform accurate localization by using triangulation in the cluster.

The clustering method using a node for self localization according to an embodiment of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data and storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A node which is located in a specific space so as to constitute a sensor network, the node comprising:
    a location information messaging unit which receives one or more location information messages from at least one message sending node in the sensor network, including information on spatial locations of one or more neighboring nodes in the sensor network;
    a distance calculator which calculates a first distance from the node to each of the neighboring nodes on the basis of the location information included in the received location information messages and calculates a second distance from the node to each of the neighboring nodes on the basis of a received time or intensity of the location information message; and
    a clustering unit which forms a cluster of the node and a plurality of neighboring nodes of which the difference in distance of the first distance compared to the second distance is less than a predetermined threshold.

2. The node of claim 1, further comprising a broadcasting unit which broadcasts the location information message including information on its own location in the sensor network.

3. A new node which is added to the sensor network constructed by clusters including at least one node, the new node comprising:
    a location request messaging unit which receives location response messages from at least one message sending node in the sensor network, including information on the spatial locations of at least one node and information on the clusters;
    a cluster determiner which calculates distances from the new node to each node on the basis of a received time or intensity of the location response message and determines the cluster including one or more nodes of which the calculated distance is less than the predetermined threshold to be the cluster including the new node; and
    a localization unit which recognizes relative distances from the new node to one or more nodes in the cluster including the new node to localize the new node's own location.

4. The new node of claim 3, further comprising a broadcasting unit which broadcasts a localization request message for requesting localization of the new node's own location in the sensor network.

5. The new node of claim 3, wherein the information on the cluster including the new node includes an identification code of the cluster and the number of fixed nodes included in the cluster.

6. The new node of claim 3, wherein the localization unit recognizes the new node's own location by triangulation.

7. The new node of claim 3, wherein the cluster determiner counts the nodes which transmit a location response message and determines the cluster including a determined maximum number of nodes from among fixed nodes which send a location response message to be the cluster including the new node.

8. A method of forming clusters of nodes which are located in a specific space so as to constitute a sensor network, the method comprising:
    (a) a node receiving one or more location information messages from at least one neighboring node in the sensor network, including information on spatial locations of one or more neighboring nodes in the sensor network;
    (b) calculating first distances from the node to the neighboring nodes on the basis of the location information included in the received the location information messages and calculating second distances from the node to one or more neighboring nodes on the basis of a received time or intensity of the location information message; and (c) forming clusters of the node and a plurality of neighboring nodes of which the difference in distance of the first distance compared to the second distance is less than a predetermined threshold.

9. A method of localizing a new node which is added to a sensor network constructed by clusters including at least one node, the method comprising:

(a) receiving location response messages from at least one message sending node in the sensor network, including information on the spatial locations of the nodes and information on the clusters;

(b) calculating distances from the new node to each node on the basis of received time or intensity of the location response messages and determining a new cluster, including the new node and any node for which the calculated distance is less than a predetermined threshold, to be the cluster designated as including the new node; and (c) recognizing relative distances from the new node to one or more nodes in the new cluster to localize the new node's own location.

10. A method of localizing a new node which is added to a sensor network, the method comprising:

(a) allowing a first node from among nodes having their own location information to broadcast a location information message including location information on the first node's own location in the sensor network;

(b) obtaining location information messages of one or more additional nodes from among the nodes which receive the location information message so as to have the one or more additional nodes' own location information;

(c) calculating first distances from the first node to the additional nodes on the basis of the location information of the first node and the additional nodes included in the location information messages and calculating second distances from the first node to the additional nodes on the basis of a received time or intensity of the location information message;

(d) forming clusters of the first node and the additional nodes of which the difference in distance of the first distance compared to the second distance is less than a threshold;

(e) allowing a new node to broadcast a location request message in the sensor network, when the new node which needs to be localized is added to the sensor network;

(f) receiving location response messages including cluster numbers from the nodes having their own location information; and (g) performing localization of the new node by using triangulation in a cluster including nodes of which distances from the new node to other nodes in the cluster calculated by using a received time or intensity of the location information message are less than a threshold.

11. A computer-readable recording medium having embodied thereon a computer program executable by a processor for executing a method of forming clusters of nodes which are located in a specific space so as to constitute a sensor network, the method comprising:

(a) a node receiving one or more location information messages from at least one neighboring node in the sensor network, including information on spatial locations of one or more neighboring nodes in the sensor network;

(b) calculating first distances from the node to one or more neighboring nodes on the basis of the location information included in the received location information messages and calculating second distances from the node to one or more neighboring nodes on the basis of a received time or intensity of the location information message; and (c) forming clusters of the node and a plurality of neighboring nodes of which the difference of the first distances compared to the second distances is less than a predetermined threshold.

12. A computer-readable recording medium having embodied thereon a computer program executable by a processor for executing a method of localizing a new node which is added to a sensor network constructed by clusters including at least one node, the method comprising:

(a) receiving location response messages from at least one neighboring node in the sensor network, including information on the spatial locations of the nodes and information on the clusters;

(b) calculating distances from the new node to each neighboring node on the basis of received time or intensity of the location response messages and determining the cluster including any nodes for which the calculated distance is less than the predetermined threshold to be the cluster including the new node; and (c) recognizing relative distances from the new node to one or more nodes in the cluster including the new node, thereby localizing the new node's own location.

13. A computer-readable recording medium having embodied thereon a computer program executable by a processor for executing a method of localizing a new node which is added to a sensor network, the method comprising:

(a) allowing a first node from among nodes having their own location information to broadcast a location information message including location information on the first node's own location in the sensor network;

(b) obtaining location information messages of one or more neighboring nodes from among the nodes which receive the location information message so as to have the one or more neighboring nodes' own location information;

(c) calculating first distances from the first node to the neighboring nodes on the basis of the location information of the first node and the neighboring nodes included in the location information messages and calculating second distances from the first node to the neighboring nodes on the basis of a received time or intensity of the location information message;

(d) forming clusters of the first node and the neighboring nodes of which the difference of the first distances compared to the second distances is less than a threshold;

(e) allowing a new node to broadcast a location request message in the sensor network, when the new node which needs to be localized is added to the sensor network;

(f) receiving location response messages including cluster numbers from the nodes having their own location information; and (g) performing localization of the new node by using triangulation in a cluster including nodes of which distances from the new node to other nodes in the sensor network calculated by using a received time or intensity of the location information message are less than a threshold.

* * * * *